Patented May 26, 1953

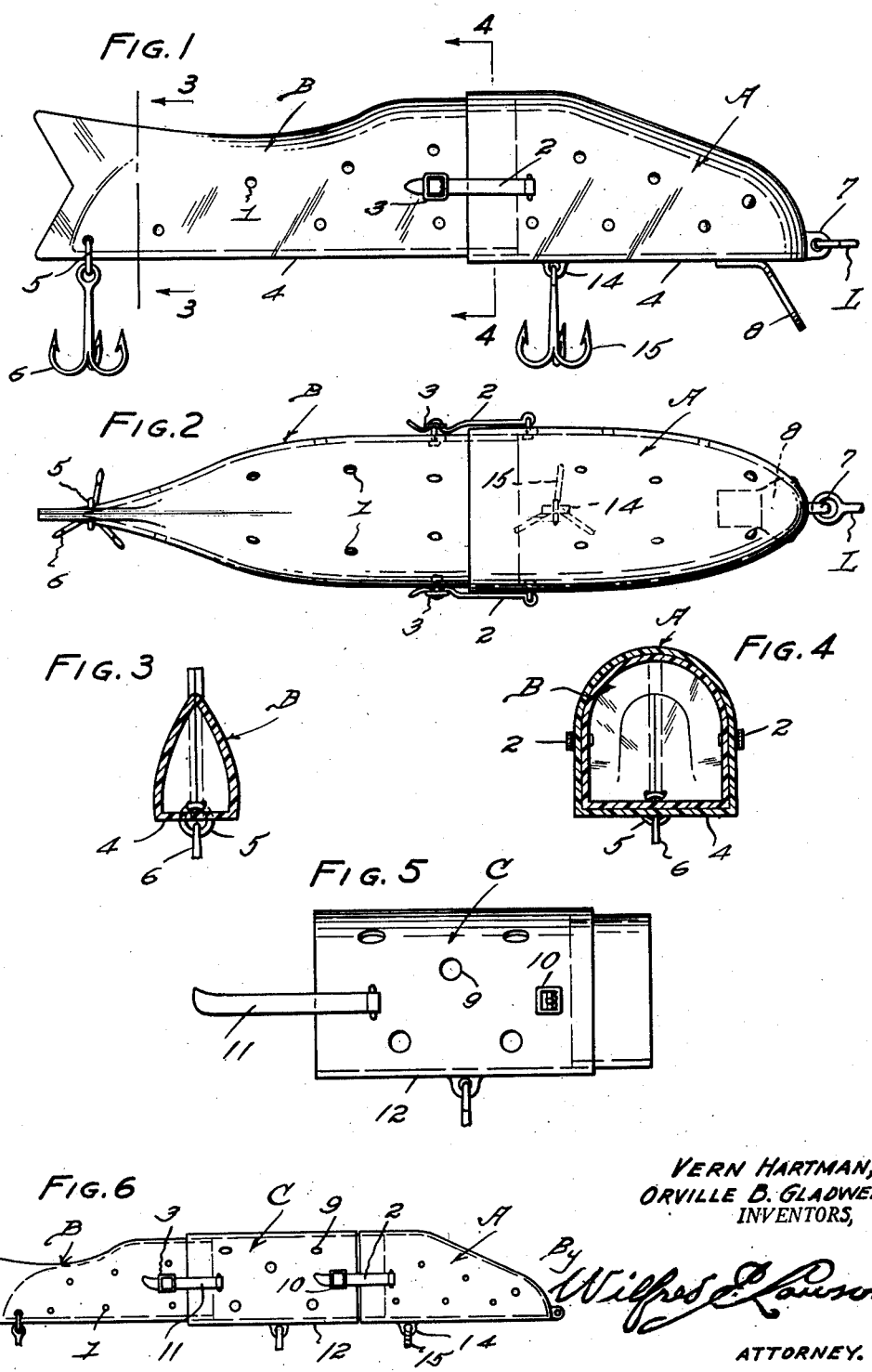

2,639,536

UNITED STATES PATENT OFFICE 2,639,536

LIVE BAIT HOLDER

Vern Hartman and Orville B. Gladwell,
El Monte, Calif.

Application September 21, 1949, Serial No. 117,008

1 Claim. (Cl. 43—41)

This invention relates to a bait holder and it is an object of the invention to provide an article of this kind which can be used to advantage with bait of different sizes and wherein the bait may be live bait, bloodworms or any other type of bait.

It is also an object of the invention to provide a device of this kind which also serves as a plug and wherein the device has an internal chamber to house and hold the bait and wherein the walls of the chamber are transparent to allow visual access within the chamber.

A still further object of the invention is to provide a device of this gind having an internal chamber to receive the bait, and wherein the walls of the chamber are perforated to allow admission of water within the chamber to sustain the bait when live and also to permit effective radiation from the device of the odor of the bait.

Furthermore, it is an object of the invention to provide a device of this kind comprising a plurality of sections which, when assembled, provide an internal chamber for holding and housing the bait and wherein said chamber may be lengthened or shortened to compensate for bait of varying sizes.

The invention consists in the details of construction and in the combination and arrangement of the several parts of my improved bait holder whereby certain advantages are attained, as will be hereinafter more fully set forth.

In order that my invention may be better understood, I will now proceed to describe the same with reference to the accompanying drawings, wherein:

Figure 1 is a view in side elevation of a bait holder constructed in accordance with an embodiment of the invention;

Figure 2 is a view in top plan;

Figure 3 is a sectional view taken substantially on the line 3—3 of Figure 1;

Figure 4 is a sectional view taken substantially on the line 4—4 of Figure 1;

Figure 5 is a fragmentary view in side elevation of a modified form of the invention; and Figure 6 is a side elevational view on a reduced scale of the complete holder as embodied in Figure 5.

In the embodiment of the invention as illustrated in Figures 1 to 4 of the accompanying drawings, the bait holder comprises two members A and B, which, when in assembly, are in simulation of a fish.

The member A constitutes the front end portion and the section B the rear end portion of the device. These members A and B are hollow and open at their inner ends and closed at their outer ends. The walls of the members A and B are substantially transparent and may be of plastic or other material possessing the necessary qualifications. The walls of the members A and B are also provided at points therealong with the relatively small openings 1 to allow ready admission of fluid into the device and for circulation therethrough to sustain live bait within the device and also to allow radiation from the device of the odor from the bait therein.

When the members A and B are assembled, the member A has its inner open end portion snugly and telescopically engaged with the inner open end portion of the member B. These members A and B can be adjusted lengthwise one with respect to the other to permit the device as a unit to be lengthened or shortened within certain limitations to accommodate the bait placed therein and which may be live bait, bloodworms or bait of any other type.

The member A, at opposite sides thereof has secured thereto the extremities of the rearwardly disposed straps or flexible members 2 which have adjustable holding engagement with the buckles 3 or the like carried by the opposite sides of the member B in close proximity to the inner open end of said member B. These straps 2 and buckles 3 coact to hold the assembled members A and B against outward or separating movement.

The members A and B have the bottom or under portions of their walls flattened, as at 4, to provide a striking surface for the fish extending from one end of the device to the other. Operatively engaged, as at 5, with the outer or closed end portion of the member B is a depending fish hook 6 herein disclosed as of a triple type. The forward or closed end portion of the member A is provided with a forwardly or outwardly disposed lug 7 with which engages a fish line L. The rear member B has its rear end portion contracted to form a central, relatively narrow, inverted V-shaped fin simulating the caudal fin of a fish.

The flattened bottom portion of the member A, closely adjacent to the outer or closed end of said member, is provided with a downwardly disposed flat fin 8 directed on a predetermined forward incline of about thirty degrees. The outer flat face of the fin 8 is disposed transversely of the flat portion 4 of the member A. This outer flat face of the fin 8 is also disposed substantially entirely across the associated forward extremity of the flattened portion 4 of the member A. This fin 8 provides means for maintaining the device submerged while being drawn through the water.

In the embodiment of the invention as illustrated in Figures 5 and 6 of the device further includes a central or intermediate portion C which allows the device to be employed with bait of greater length than can be used in connection with the sections A and B.

The central or intermediate section is hollow throughout its length with its walls transparent and provided with the openings 9.

When the members A, B, and C are assembled, as in Figure 6, the member A has its inner open end portion snugly and telescopically engaged with one end portion of the member C and the inner or open end portion of the member B is snugly and telescopically engaged with the opposite end portion of the member C. The members A and B may be individually adjusted lengthwise with respect to the member C within certain limitations as the requirements of practice may necessitate.

The member C at each side of one end portion is provided with a buckle 10 adapted to have adjustable holding engagement with one of the straps or flexible members 2 of the member A. At each side of the member C at the opposite end portion, is secured an extremity of a strap or flexible member for adjustable holding engagement with one of the buckles 3 carried by the rear member B.

While a single intermediate member C only is shown in Figure 6 of the drawings, it is believed obvious that said intermediate member may comprise a number of sections with adjacent sections in telescopic engagement whereby the intermediate member C may be lengthened or shortened independently of the members A and B. It is not believed, however, that a detailed description and/or illustration of such an arrangement is necessary.

It is also to be understood that the under or bottom portion 12 of member C is flattened.

It is also desirable to provide the inner part of the flat bottom 4 of the member A at substantially the transverse center thereof with a depending eye element 14 with which is operatively engaged a depending fish hook 15 also shown of a triple type.

From the foregoing description it is thought to be obvious that a bait holder constructed in accordance with our invention is particularly well adapted for use by reason of the convenience and facility with which it may be assembled and operated.

We claim:

In a live bait holder, a hollow transparent body formed of front and rear end members having their adjacent ends open for telescopic engagement one with the other and their bottoms substantially flat, coupling straps at the opposite sides of the members for detachably securing the same together, said members having their opposite sides perforated for the circulation of water through the body to keep the bait alive, the top side of the body from end to end being irregularly shaped to conform generally to the shape of that part of the body of a fish, the rear member having its rear end portion contracted to form a central, relatively narrow, inverted V-shaped fin simulating the caudal fin of a fish, an apertured lug at the forward end of the front member for the attaching of a trolling line to the body, and hooks suspended from the lower sides of the front and rear members, the points of suspension of said hooks being in line with the longitudinal center of the bottoms of said members, and that of the rearmost hook being beneath the caudal fin forming portion of the rear member.

VERN HARTMAN.
ORVILLE B. GLADWELL.

References Cited in the file of this patent

UNITED STATES PATENTS

| Number | Name | Date |
|---|---|---|
| 933,818 | Beatty | Sept. 14, 1909 |
| 1,038,866 | Fuller et al. | Sept. 17, 1912 |
| 1,101,655 | Ness | June 30, 1914 |
| 1,544,129 | Burt | June 30, 1925 |
| 1,673,978 | Guindon | June 19, 1928 |
| 2,081,671 | Lauer | May 25, 1937 |
| 2,112,385 | Smith | Mar. 29, 1938 |
| 2,302,206 | Gibson et al. | Nov. 17, 1942 |
| 2,487,344 | Lambert | Nov. 8, 1949 |